United States Patent
Suzuki et al.

(10) Patent No.: US 10,465,624 B2
(45) Date of Patent: Nov. 5, 2019

(54) START-UP CONTROL DEVICE FOR ENGINE

(71) Applicants: TOYOTA JIDOSHA KABUSHIKI KAISHA, Toyota-shi (JP); FUJITSU TEN LIMITED, Kobe-shi (JP)

(72) Inventors: Yusuke Suzuki, Hadano (JP); Kunihiko Usui, Fuji (JP); Kazuya Koyama, Kobe (JP)

(73) Assignees: TOYOTA JIDOSHA KABUSHIKI KAISHA, Toyota-shi (JP); FUJITSU TEN LIMITED, Kobe-shi (JP)

(*) Notice: Subject to any disclaimer, the term of this patent is extended or adjusted under 35 U.S.C. 154(b) by 0 days.

(21) Appl. No.: 15/791,777

(22) Filed: Oct. 24, 2017

(65) Prior Publication Data
US 2018/0112610 A1   Apr. 26, 2018

(30) Foreign Application Priority Data
Oct. 25, 2016   (JP) .................. 2016-208448

(51) Int. Cl.
*F02N 11/08*   (2006.01)
*F02D 41/06*   (2006.01)
(Continued)

(52) U.S. Cl.
CPC ......... *F02D 41/065* (2013.01); *F02D 41/009* (2013.01); *F02D 41/1444* (2013.01); *F02D 41/40* (2013.01); *F02N 99/006* (2013.01); *F02P 5/045* (2013.01); *F02D 41/1448* (2013.01); *F02D 41/1454* (2013.01);
(Continued)

(58) Field of Classification Search
CPC .. F02D 41/065; F02D 41/009; F02D 41/1444; F02D 41/40; F02D 41/1448; F02D 41/001; F02D 2041/0092; F02D 2041/0095; F02N 99/006; F02N 2019/002; F02N 2019/007; F02N 2019/008; F02N 19/005; F02P 5/045
USPC ....... 123/491, 493, 436, 179.16, 90.15, 494, 123/179.3, 179.4; 701/103, 104, 105, 701/110, 112, 113; 73/114.31
See application file for complete search history.

(56) References Cited

U.S. PATENT DOCUMENTS

| | | | |
|---|---|---|---|
| 7,051,693 B2* | 5/2006 | Tetsuno | F02D 41/042 |
| | | | 123/179.5 |
| 7,191,746 B2* | 3/2007 | Nakamura | F01L 13/0026 |
| | | | 123/179.18 |

(Continued)

FOREIGN PATENT DOCUMENTS

| | | |
|---|---|---|
| JP | 5-312068 | 11/1993 |
| JP | 2004-27914 A | 1/2004 |

(Continued)

*Primary Examiner* — Hai H Huynh
*Assistant Examiner* — Gonzalo Laguarda
(74) *Attorney, Agent, or Firm* — Oblon, McClelland, Maier & Neustadt, L.L.P.

(57) ABSTRACT

When a crankshaft reversely rotates immediately before a stoppage of an engine, the amount of fuel injection in a cylinder in an expansion stroke is controlled to acquire a target air-fuel ratio in accordance with the amount of air in the cylinder. When the electronic control unit determines that the exhaust valve is opened at the time of reverse rotation, the amount of fuel injection is determined by considering a change in the amount of air due to exchange of gas with an exhaust path.

16 Claims, 7 Drawing Sheets

(51) Int. Cl.
*F02D 41/00* (2006.01)
*F02D 41/14* (2006.01)
*F02D 41/40* (2006.01)
*F02P 5/04* (2006.01)
*F02N 99/00* (2010.01)
*F02D 41/38* (2006.01)
*F02N 19/00* (2010.01)

(52) U.S. Cl.
CPC ............... *F02D 2041/389* (2013.01); *F02D 2200/0402* (2013.01); *F02N 2019/002* (2013.01); *Y02T 10/44* (2013.01)

(56) References Cited

U.S. PATENT DOCUMENTS

| | | | | |
|---|---|---|---|---|
| 8,671,903 | B2* | 3/2014 | Notani | F02N 11/0855 |
| | | | | 123/179.4 |
| 8,904,983 | B2* | 12/2014 | Enoki | F02N 11/0818 |
| | | | | 123/179.3 |
| 9,726,134 | B2* | 8/2017 | Okabe | F02N 11/0844 |
| 2004/0149247 | A1* | 8/2004 | Kataoka | F02N 11/006 |
| | | | | 123/179.4 |
| 2004/0200448 | A1* | 10/2004 | Kojima | F02N 11/0851 |
| | | | | 123/179.3 |
| 2008/0257310 | A1* | 10/2008 | Theobald | B60K 6/24 |
| | | | | 123/41 E |
| 2009/0037085 | A1* | 2/2009 | Kojima | F02N 11/0844 |
| | | | | 701/113 |
| 2009/0132155 | A1* | 5/2009 | Kojima | F02D 11/10 |
| | | | | 701/113 |
| 2010/0059007 | A1* | 3/2010 | Senda | F02N 11/0844 |
| | | | | 123/179.4 |

FOREIGN PATENT DOCUMENTS

| | | |
|---|---|---|
| JP | 2006-299997 A | 11/2006 |
| JP | 2016-136015 | 7/2016 |

\* cited by examiner

START-UP CONTROL DEVICE FOR ENGINE

INCORPORATION BY REFERENCE

The disclosure of Japanese Patent Application No. 2016-208448 filed on Oct. 25, 2016 including the specification, drawings and abstract is incorporated herein by reference in its entirety.

BACKGROUND

1. Technical Field

The disclosure relates to start-up control of an engine when a restart condition for the engine is established immediately before a stoppage of the engine, and particularly, relates to control of the amount of fuel injection when fuel is injected into a cylinder in an expansion stroke.

2. Description of Related Art

A system that automatically stops an engine of a vehicle at the time of idling or the like and then automatically restarts the engine (stop-start system) is known in the related art. In such a system, injecting fuel into a cylinder in an expansion stroke to ignite the fuel is suggested to start up the engine without using a starter motor (hereinafter, referred to as starterless start-up), when a restart condition is established immediately before an automatic stoppage of the engine.

For example, as disclosed in Japanese Unexamined Patent Application Publication No. 2016-136015 (JP 2016-136015 A), when fuel injection and ignition are stopped in order to stop the engine, inertial force of a crankshaft or the like rotating by inertia is decreased, and a piston in any cylinder in a compression stroke cannot pass a top dead center. The crankshaft completely stops after a rebounding period in which the crankshaft instantaneously stops before the top dead center, reversely rotates, and then forwardly rotates again.

When the restart condition is established immediately before the rotation of the crankshaft stops, a piston in the cylinder in the expansion stroke rises toward the top dead center by such reverse rotation. Based on this fact, fuel is injected into the cylinder, and an air-fuel mixture is ignited when the piston reaches a predetermined position near the top dead center. Accordingly, rotating force (combustion torque) is imparted to the crankshaft, and the engine can be started up.

SUMMARY

Such reverse rotation of the crankshaft is mainly due to a significant cylinder internal pressure (compression reaction force) that the piston in the cylinder in the compression stroke receives, and the position where the crankshaft instantaneously stops immediately before the reverse rotation may vary. The positional variation is mainly due to variations in the kinetic energy of the crankshaft or the like when the immediately previous top dead center (TDC) (the last TDC before the stoppage) is passed, and are also affected by variations in friction, compression, and the like in the engine.

When the piston in the cylinder in the compression stroke approaches the top dead center and instantaneously stops, the piston in the cylinder in the expansion stroke approaches a bottom dead center and instantaneously stops, and an exhaust valve is opened. The opened exhaust valve is closed again by reverse rotation of the crankshaft, and in the meantime, gas is exchanged between the inside of the cylinder and an exhaust port.

That is, when the engine is stopped as described above, an atmospheric state is set in the cylinder and the exhaust port by a stoppage of fuel supply. In this state, when the exhaust valve is opened, air flows from the exhaust port into the cylinder in which the pressure is negative at the end of the expansion stroke. Regarding this point, the amount of fuel injected into the engine in the related art (JP 2016-136015 A) is determined without considering such inflow of air from the exhaust port. Thus, the air-fuel ratio shifts to a lean side from a target value, and a decrease in startability of the engine or emission deterioration may be caused.

The disclosure reduces a decrease in startability and emission deterioration by decreasing shifts in the air-fuel ratio when fuel is injected into a cylinder in an expansion stroke by establishment of a restart condition in the course of stopping an engine.

The disclosure provides a start-up control device for an engine, the device controlling the amount of fuel injection by considering a change in the amount of air based on gas exchange between the inside of a cylinder and an exhaust path when a crankshaft reversely rotates immediately before a stoppage.

An aspect of the disclosure relates to a start-up control device for an engine. The start-up control device includes an electronic control unit configured to start up a direct injection engine by executing fuel injection and ignition into a cylinder in an expansion stroke, when a restart condition is established immediately before a stoppage of the engine. When a crankshaft reversely rotates before a stoppage of rotation of the crankshaft, the electronic control unit is configured to cause a fuel injection valve to inject fuel into the cylinder in the expansion stroke, and is configured to control an amount of fuel injection in accordance with an amount of air in the cylinder in the expansion stroke such that an air-fuel ratio of a mixture of the fuel and the air reaches a target air-fuel ratio. The electronic control unit is configured to determine whether or not an exhaust valve is opened at a time of reverse rotation of the crankshaft, and is configured to determine the amount of fuel injection in accordance with a change in the amount of air in the cylinder due to exchange of gas with an exhaust path, when the electronic control unit determines that the exhaust valve is opened.

The aspect controls the amount of fuel injection in accordance with a change in the amount of air based on the fact that the amount of air in a cylinder in an expansion stroke changes due to exchange of gas with an exhaust path when an exhaust valve in the cylinder is opened when a crankshaft rotates reversely immediately before a stoppage of an engine. Thus, the aspect can reduce a decrease in startability of the engine and emission deterioration by decreasing a shift in air-fuel ratio from a target value thereof.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the disclosure will be described with reference to the drawings. The present embodiment illustratively describes the case of applying the disclosure to a gasoline engine mounted in a vehicle.

Summary of Engine

Figure 1:
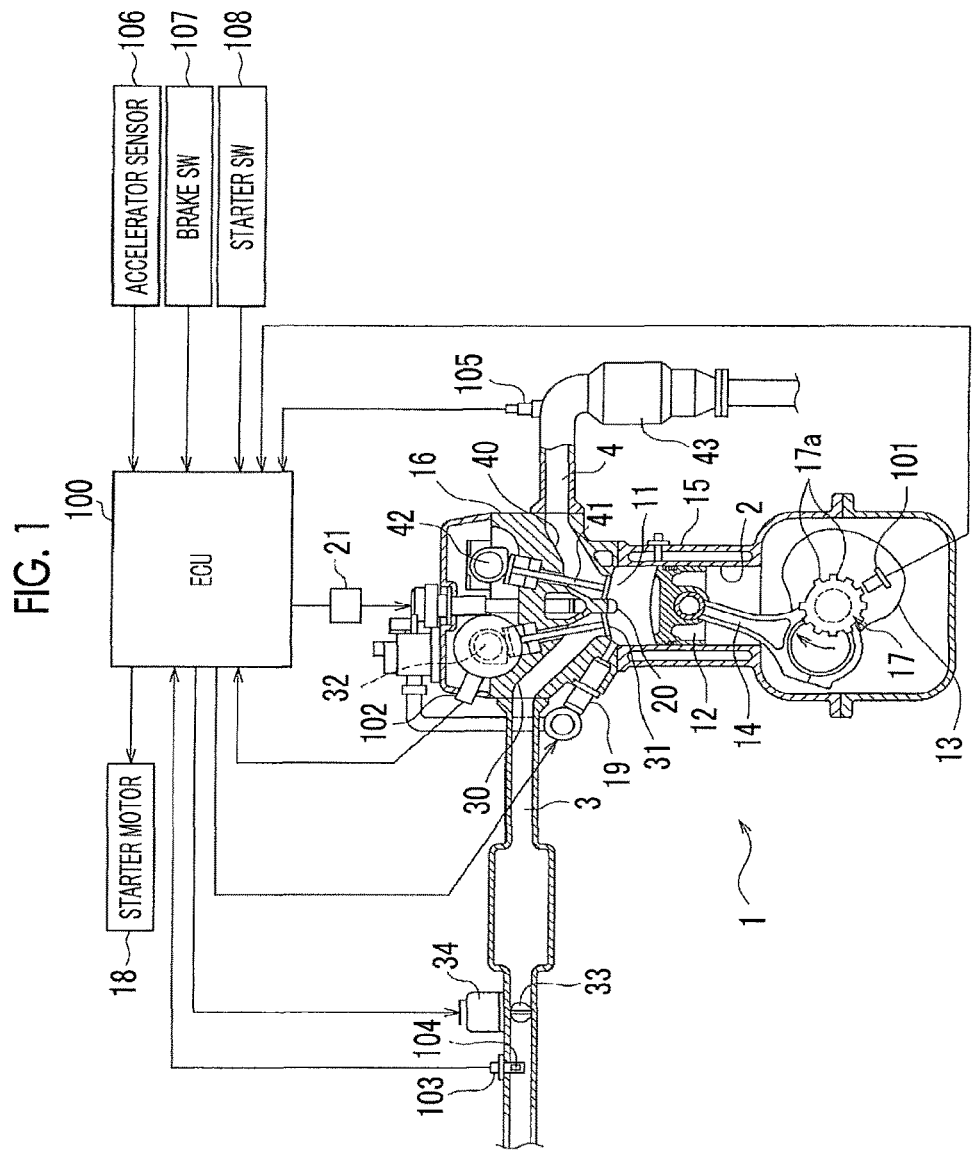
FIG. 1 is a schematic configuration diagram of an engine according to an embodiment.

A schematic configuration of an engine 1 of the present embodiment is illustrated in FIG. 1. The engine 1 is a four-cylinder gasoline engine. Each of four cylinders 2 (FIG. 1 illustrates one) of first to fourth cylinders accommodates a piston 12 in the form of dividing a combustion chamber 11. The piston 12 and a crankshaft 13 are connected to each other by a connecting rod 14. A crank angle sensor 101 is disposed to detect the rotational angle (crank angle) of the crankshaft 13.

Specifically, a signal rotor 17 is attached to the crankshaft 13, and a plurality of teeth 17a is disposed on the outer circumferential surface of the signal rotor 17. The crank angle sensor 101 includes, for example, two electromagnetic pickups. Each electromagnetic pickup outputs a pulse signal each time the teeth 17a of the signal rotor 17 pass the crank angle sensor 101 by rotation of the crankshaft 13.

A signal output from one of the two electromagnetic pickups is a crank signal, and a signal output from the other electromagnetic pickup has a predetermined phase difference from the crank signal. Thus, a determination as to whether the crankshaft 13 forwardly rotates or not (reversely rotates) can be made by whether the signal of the other electromagnetic pickup is high or low at the time of a rise or a fall of the signal from one electromagnetic pickup.

A flywheel, though not illustrated, is attached to an end portion of the crankshaft 13 to integrally rotate with the crankshaft 13. A starter motor 18 (schematically illustrated in FIG. 1) is disposed to be rotatable by meshing a pinion gear with a ring gear formed on the outer circumference of the flywheel. When the engine 1 is typically started up, the starter motor 18 operates by receiving signals from an electronic control unit (ECU) 100 as described below.

A cylinder head 16 is mounted in an upper portion of a cylinder block 15. An injector 19 is disposed for each cylinder 2 and faces the combustion chamber 11. For example, fuel that is injected from the injector 19 in an intake stroke of the cylinder 2 diffuses in the flow of air intake in the cylinder 2 to form an air-fuel mixture. A spark plug 20 is disposed in the cylinder head 16 in order to ignite the formed air-fuel mixture. The spark plug 20 sparks by receiving power supplied from an igniter 21.

In the cylinder head 16, an intake port 30 and an exhaust port 40 are formed to communicate with the combustion chamber 11 in each cylinder 2. Opening portions of each of the intake port 30 and the exhaust port 40 facing the inside of the cylinder 2 are opened and closed by an intake valve 31 and an exhaust valve 41. A valve train that operates the intake valve 31 and the exhaust valve 41 includes two intake and exhaust camshafts 32, 42 and is rotated by the crankshaft 13 through a timing chain and sprockets not illustrated.

A cam angle sensor 102 is disposed near the intake camshaft 32 to output a pulse signal (hereinafter, referred to as a cam signal) when any cylinder 2 is in a predetermined crank angle position (for example, the first cylinder 2 is at a top dead center). The intake camshaft 32 rotates at a half speed of the crankshaft 13. Thus, the cam angle sensor 102 outputs the cam signal at least once each time the crankshaft 13 rotates twice (changes by a crank angle of 720°).

An air flow meter 103, an intake temperature sensor 104 (incorporated in the air flow meter 103), and an electronically controlled throttle valve 33 are disposed in an intake path 3 that communicates with the upstream side (the upstream side in the flow of air intake) of the intake port 30. The throttle valve 33 is driven by a throttle motor 34 and adjusts the amount of air intake of the engine 1 by narrowing the flow of the air intake.

The flow of air intake of which the flow rate is adjusted by the throttle valve 33 flows into each cylinder 2 from the intake port 30 and is mixed with fuel injected from the injector 19 to form an air-fuel mixture as described above. The air-fuel mixture is ignited by the spark plug 20 and combusted in the latter half of a compression stroke, thereby generating gas, and the gas flows to the exhaust port 40 in an exhaust stroke of the cylinder 2. A catalyst 43 for exhaust control is disposed in an exhaust path 4 that communicates with the downstream side (the downstream side in the flow of exhaust air) of the exhaust port 40. An air-fuel ratio sensor 105 is disposed on the upstream side of the exhaust port 40.

The engine 1 configured as heretofore is controlled by the ECU 100. The ECU 100 is a known electronic control unit and, though not illustrated, includes a central processing unit (CPU), a read only memory (ROM), a random access memory (RAM), a backup RAM, and the like. The CPU executes various calculations based on control programs and maps stored in the ROM. The RAM temporarily stores calculation results of the CPU, data input from each sensor, and the like. The backup RAM stores, for example, data that is to be stored at the time of stoppage of the engine 1.

An accelerator sensor 106 that detects the operation amount of an accelerator pedal (accelerator operation amount), a brake switch (brake SW) 107 that detects an operation of a brake pedal, a starter switch (starter SW) 108 that operates the starter motor 18, and the like are connected to the ECU 100 in addition to the crank angle sensor 101, the cam angle sensor 102, the air flow meter 103, the intake temperature sensor 104, the air-fuel ratio sensor 105, and the like described above.

The ECU 100 executes various control programs based on signals input from the sensors and switches 101 to 108, thereby controlling the operating state of the engine 1. For example, the ECU 100 executes fuel injection control (control of the amount of injection and the timing of injection) by the injector 19, ignition control (control of the timing of ignition by the spark plug 20) by the igniter 21, control of the throttle opening degree (that is, control of the amount of air intake) by the throttle motor 34, and the like.

Figure 2:
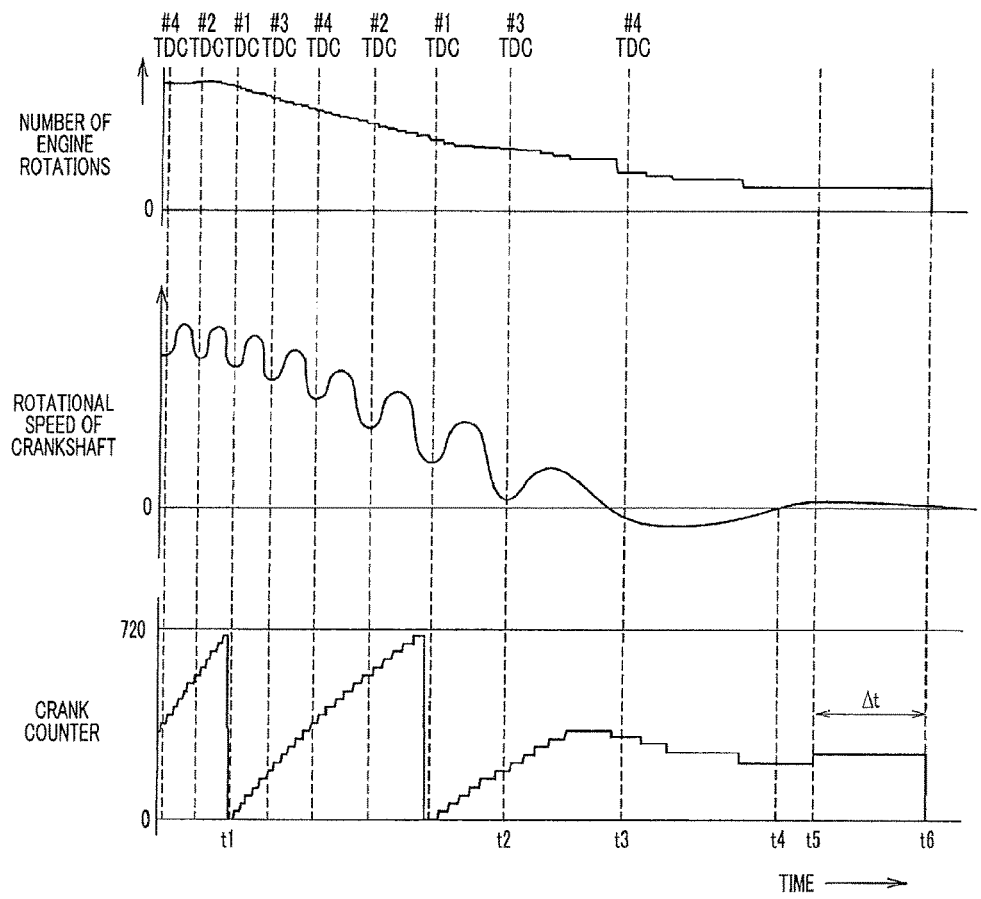
FIG. 2 is a timing chart illustrating one example of the number of engine rotations, the rotational speed of a crankshaft, and a change in a crank counter when the engine stops.

The fuel injection control and the ignition control are performed at suitable timings for each cylinder 2. In order to do so, a crank counter that has one cycle corresponding to two rotations (a crank angle of 720°) of the crankshaft 13 is generated. For example, as illustrated in FIG. 2, the crank counter is generated with the top dead center (#1TDC) of the first cylinder 2 as a reference, is reset in response to an input of the cam signal at time t1 as illustrated in the lower part of FIG. 2, and is counted up in response to an input of the crank signal after a count value becomes zero.

The ECU 100 operates the starter motor 18 when the starter SW 108 is switched ON, rotates the crankshaft 13 (cranking), and controls fuel injection and ignition at the time of start-up, thereby starting up the engine 1 (typical start-up). Furthermore, as described below, the ECU 100 executes stop-start control that automatically stops the engine 1 under a predetermined circumstance such as a stoppage of the vehicle and then starts up the engine 1 without using the starter motor 18 (hereinafter, referred to as starterless start-up) in response to a predetermined operation performed by a driver.

Figure 3:
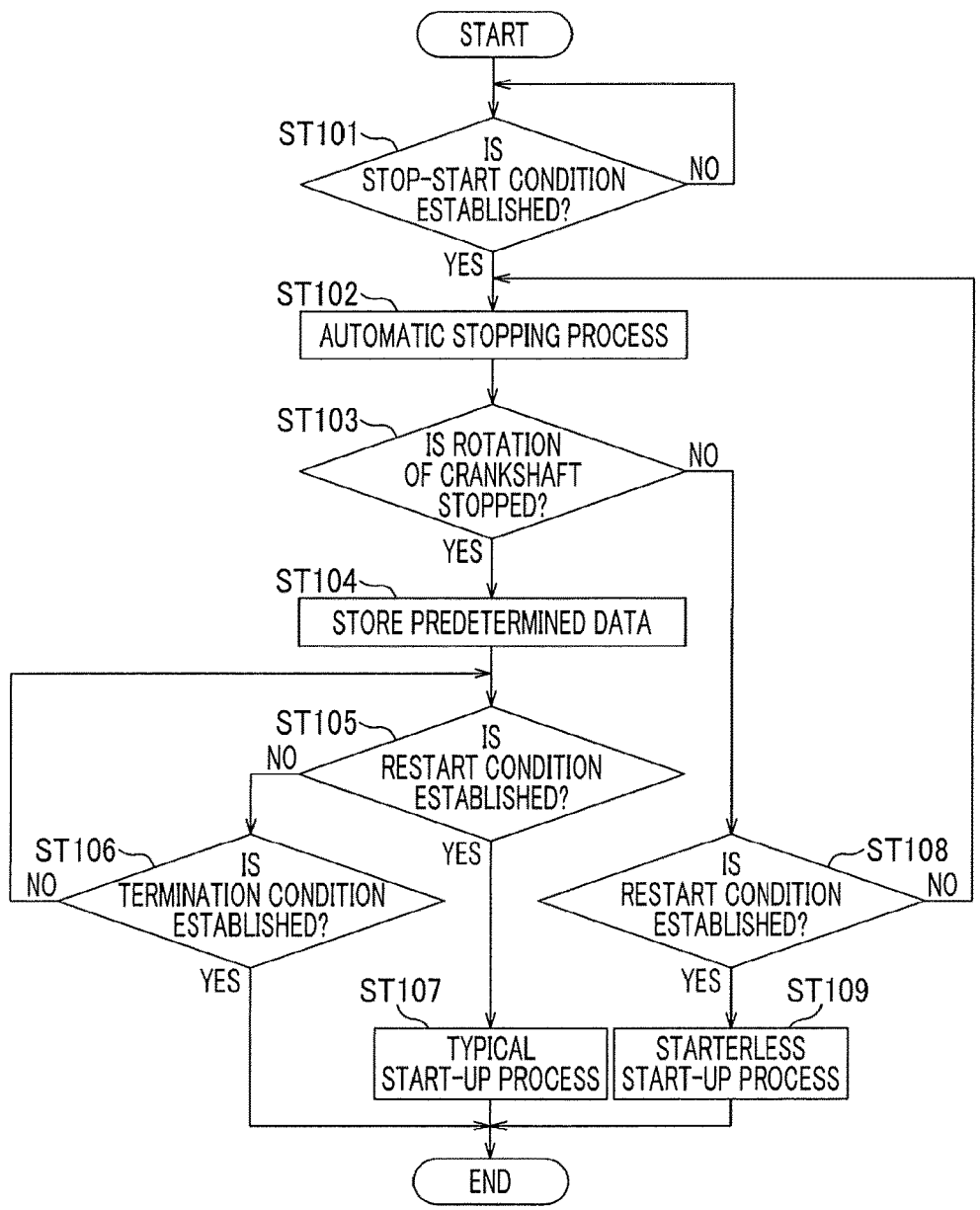
FIG. 3 is a flowchart illustrating a stop-start control routine according to the embodiment.

FIG. 3 illustrates the flow of overall processing of a stop-start control routine. The routine is repeated at predetermined timings in the ECU 100. First, in step ST101, a determination as to whether or not a predetermined stop-start condition is established during operation of the engine 1 is performed. In the case of a negative determination (NO), a return is made. In the case of a positive determination (YES), a transition is made to step ST102 in which an automatic stopping process for the engine 1 is executed.

The stop-start condition may be set to include, for example, the engine 1 being in operation, the accelerator pedal being stepped off (the accelerator operation amount is smaller than or equal to a predetermined threshold and is almost zero), the brake pedal being stepped on (a force of stepping on the brake pedal is greater than or equal to a predetermined threshold), and the speed of the vehicle being lower than or equal to a predetermined threshold (when the vehicle is considered to be at immediately before a stoppage and when the vehicle is considered to be substantially stopped).

When the automatic stopping process in step ST102 stops injection of fuel from the injector 19 and ignition by the spark plug 20, the rotational speed of the crankshaft 13 decreases as represented in FIG. 2. At this point, the throttle valve 33 may be opened to the extent corresponding to, for example, idling. As described in detail below, when a negative determination (NO) is made in determination of a stoppage of rotation of the crankshaft 13 (step ST103), a transition is made to step ST108 described below in which a determination as to whether or not a predetermined restart condition is established is performed.

In the case of a negative determination (NO) in step ST108, a return is made to step ST102. In the case of a positive determination (YES), a transition is made to step ST109 in which starterless start-up described in detail below is performed, and the routine is terminated (END). Meanwhile, in step ST103, in the case of a positive determination (YES) that rotation of the crankshaft 13 is stopped, a transition is made to step ST104 in which predetermined data is stored in the backup RAM.

Then, the ECU 100 waits for establishment of the predetermined restart condition. That is, a determination as to whether or not the restart condition for the engine 1 is established is performed in step ST105. In the case of a negative determination (NO), a transition is made to step ST106 in which a determination as to whether or not a termination condition for the stop-start control such as an ignition switch of the vehicle being switched OFF is established is performed. In the case of a positive determination (YES) as to establishment of the condition, the routine is terminated (END).

In the case of a negative determination (NO) by non-establishment of the termination condition for the stop-start control, a return is made to step ST105. In the case of a positive determination (YES) by establishment of the restart condition, a transition is made to step ST107 in which a typical restart process for the engine 1 is executed. The restart condition may be set to include, for example, the force of stepping on the brake pedal being reduced below the predetermined threshold, the accelerator pedal being stepped on, and a predetermined operation of a shift lever being performed.

The typical restart process, though not described in detail, is such that the starter motor 18 is operated to initiate cranking, initiate fuel injection by the injector 19, and initiate ignition by the spark plug 20. Accordingly, combustion is started in any cylinder 2 (initial explosion). When the number of engine rotations rises to a predetermined value (completion of start-up), the routine is terminated (END).

Next, the determination of a stoppage of rotation of the crankshaft 13 in step ST103 of the flow will be described in detail. When the engine 1 stops, the number of engine rotations is decreased as represented in the upper part of FIG. 2. At this point, the rotational speed of the crankshaft 13 is generally decreased as illustrated in the middle part of FIG. 2. In addition, the interval between inputs of the crank signals is increased, and thus, the inclination of a graph of the crank counter is gradually decreased as illustrated in the lower part of FIG. 2.

In the course of stopping the engine 1, rotation of the crankshaft 13 is decelerated by a rising cylinder internal pressure (compression reaction force of the cylinder 2) in the compression stroke of each cylinder 2, and the rotational speed of the crankshaft 13 is decreased as approaching the top dead center (TDC) as represented in the middle part of FIG. 2. When a transition is made to an expansion stroke by passing the top dead center, rotation of the crankshaft 13 is accelerated by the cylinder internal pressure, and thus, the rotational speed rises.

That is, the rotational speed of the crankshaft 13 repeatedly decreases and rises before and after the top dead centers (#1TDC, #3TDC, #4TDC, . . . ) of each cylinder 2 and is generally gradually decreased. Accordingly, inertial force of the rotation is decreased. In the example of FIG. 2, after the top dead center (#3TDC) of the third cylinder 2 is passed at time t2, the top dead center (#4TDC) cannot be passed due to the cylinder internal pressure of the fourth cylinder 2 at time t3.

Thus, the crankshaft 13 completely stops through a rebounding period in which the crankshaft 13 instantaneously stops before the top dead center, reversely rotates, and then operates again slightly in the direction of forward rotation. At this point, after the crankshaft 13 reversely rotates slightly before time t3, the crank counter is decreased in response to the crank signal. When the crankshaft 13 operates again in the direction of forward rotation at time t4, the crank counter is increased at time t5.

When the pivot angle of the crankshaft 13 is decreased while the crankshaft 13 comes to a stop through the rebounding period, the crank angle sensor 101 does not output the crank signal. When the amount of time in which the crank signal is not input, such as time t5 to time t6, is equal to a time Δt set in advance (time t0), rotation of the crankshaft 13 is determined to be stopped (that is, the engine 1 completely stops).

Next, the starterless start-up of the engine 1 in step ST109 of the flow in FIG. 3 will be described in detail. The automatic stopping of the engine 1 by the stop-start control is typically when the driver tries to stop the vehicle. However, the driver may change mind (change of mind (COM)) and start up the engine 1 again before the engine 1 completely stops.

At this point, the driver, for example, steps off the brake pedal and steps on the accelerator pedal. Thus, the restart condition for the engine 1 is established (YES in step ST108), and thereby, fuel injection and ignition into the cylinder 2 in the intake stroke or the compression stroke are started again. Accordingly, rotating force is imparted to the crankshaft 13, and the engine 1 can be started up without using the starter motor 18.

That is, when the restart condition is established at the time of a high number of engine rotations and great inertial force of rotation of the crankshaft 13 to a certain extent, for example, as in time t1 to time t2 described above with reference to FIG. 2, the injector 19 of, for example, the cylinder 2 in the compression stroke may inject fuel, thereby forming an air-fuel mixture, and then, the spark plug 20 may ignite the air-fuel mixture near the top dead center.

When the number of engine rotations is significantly low at the end of the period of time t1 to time t2, the cylinder 2 in the compression stroke may not pass the top dead center (the top dead center of the third cylinder 2 in FIG. 2: #3TDC). Therefore, the injector 19 injects fuel after the third cylinder 2 passes the top dead center (#3TDC) and transitions to the expansion stroke, and the air-fuel mixture formed is ignited. By doing so, combustion torque in the direction of forward rotation is more accurately acquired, and the engine 1 can be started up.

When, for example, the restart condition is established after time t2, the piston 12 in the fourth cylinder 2 currently in the compression stroke receives a significant cylinder internal pressure and cannot pass the top dead center (#4TDC). In this case, the crankshaft 13 instantaneously stops before the top dead center and then reversely rotates as described above. Thus, the piston 12 in the fourth cylinder 2 in the compression stroke instantaneously stops before the top dead center as illustrated by a broken line graph in the upper part of FIG. 4 (time t1 in FIG. 4) and then starts to move down.

Figure 4:
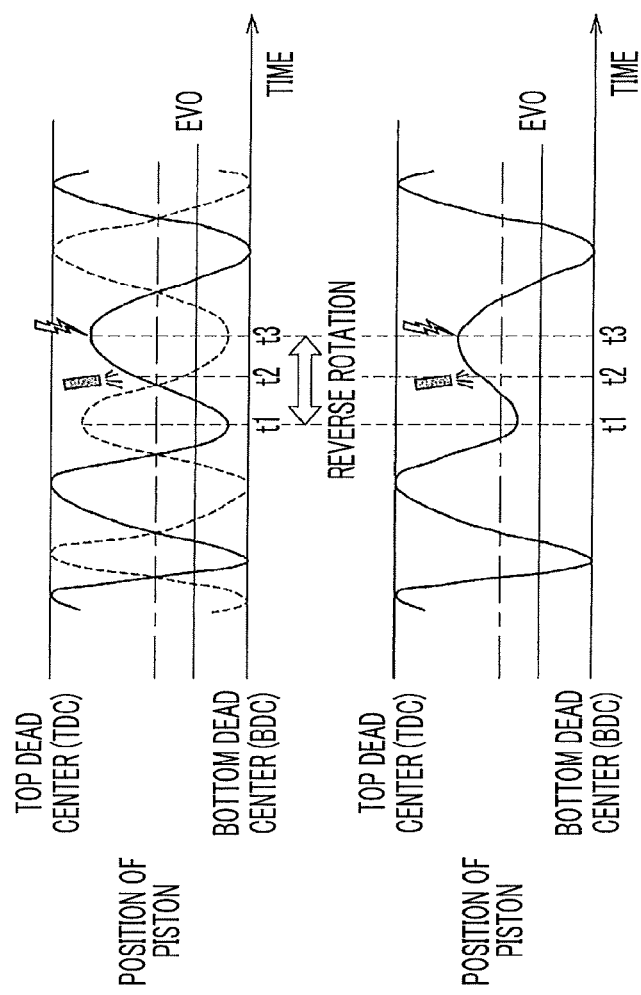
FIG. 4 is a timing chart illustrating a change in a piston position immediately before rotation of the crankshaft stops, the upper part of which illustrates the case of an exhaust valve being opened in an expansion stroke, and the lower part of which illustrates the case of the exhaust valve not being opened in the expansion stroke.

The piston 12 in the third cylinder 2 that is in the expansion stroke at this time instantaneously stops before a bottom dead center (BDC) as illustrated by a solid line graph in the upper part of FIG. 4 and then starts to rise. Therefore, fuel is injected into the third cylinder 2 (time t2 in FIG. 4), and the air-fuel mixture is ignited when the piston 12 rises to near the top dead center (time t3 in FIG. 4). By doing so, rotating force (combustion torque) can be effectively imparted to the crankshaft 13 by combustion of the air-fuel mixture.

The position where the crankshaft 13 instantaneously stops immediately before reverse rotation thereof may vary as described above. The positional variation is mainly due to variations in the kinetic energy of the crankshaft 13 or the like when the immediately previous top dead center (the last top dead center before a stoppage; #3TDC in the example) is passed. As the kinetic energy is greater, the piston 12 in the compression stroke reaches near the top dead center (#4TDC in the example).

As the piston 12 in the cylinder 2 in the compression stroke approaches the top dead center, the piston 12 in the cylinder 2 in the expansion stroke approaches the bottom dead center and at this point, may pass the opening timing of the exhaust valve 41 (illustrated as EVO in FIG. 4). That is, as illustrated by a hatched arrow in a valve timing diagram in FIG. 5, the exhaust valve 41 is opened in the latter half of the expansion stroke (in the example of FIG. 5, approximately 100° CA ATDC; "ATDC" means after TDC), passes the exhaust stroke, and then is closed at the beginning of the intake stroke.

Figure 5:
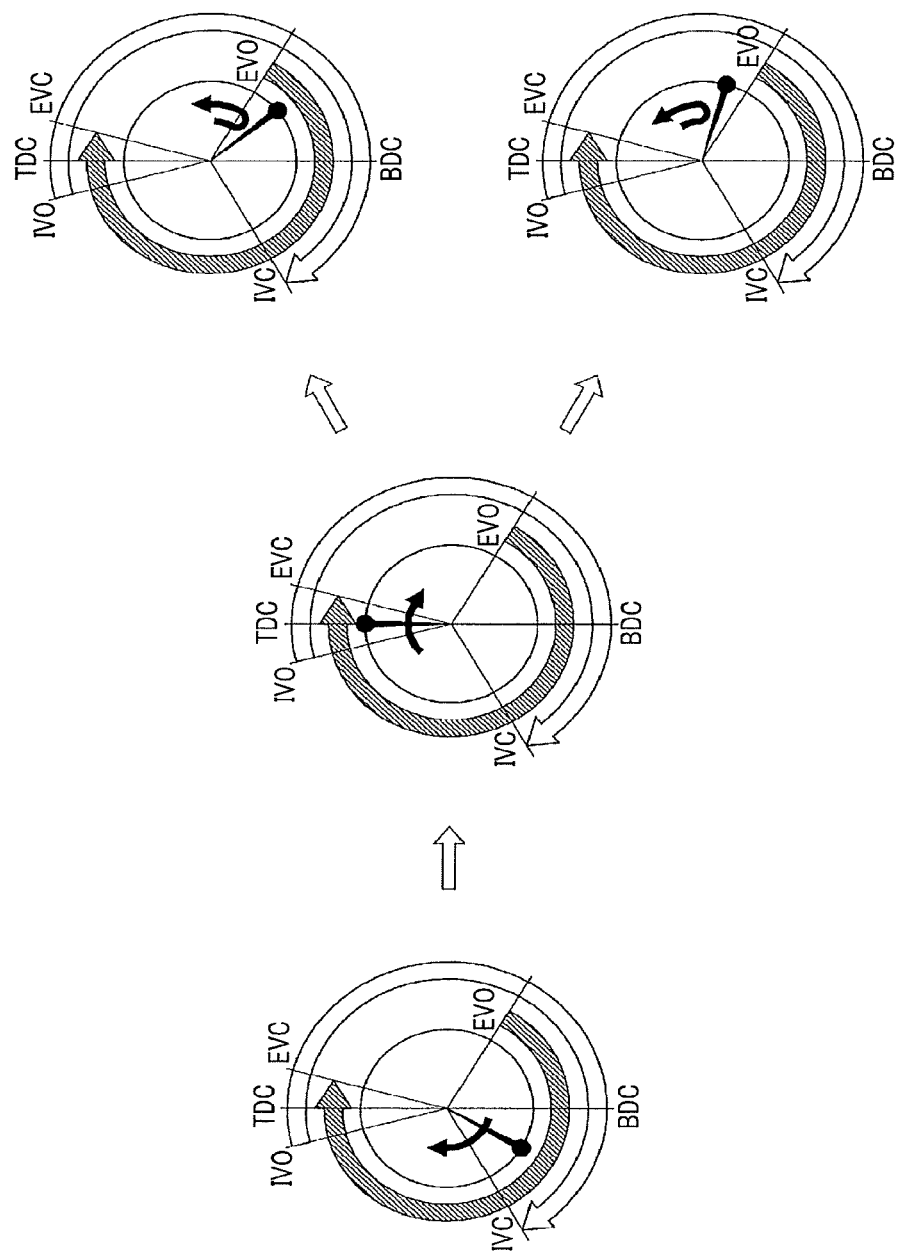
FIG. 5 is a descriptive diagram illustrating, in valve timing diagrams, the case of the exhaust valve being opened and the case of the exhaust valve not being opened in a cylinder in the expansion stroke when the crankshaft reversely rotates.

Thus, when the position where the piston 12 in the cylinder 2 in the expansion stroke instantaneously stops immediately before reverse rotation of the crankshaft 13 as described above passes "EVO" as represented at the upper right part of FIG. 5, the exhaust valve 41 is opened. Specifically, the clockwise direction in FIG. 5 is the direction of forward rotation of the crankshaft 13, and the position of the cylinder 2 (the position of the piston 12) is illustrated by a black circle.

The left part of FIG. 5 illustrates the state before opening of the intake valve 31 at the beginning of the compression stroke. The central part of FIG. 5 illustrates a state where a transition is made from the compression stroke to the expansion stroke by passing the top dead center. The upper right part of FIG. 5 illustrates a state where reverse rotation is made after the opening timing "EVO" of the exhaust valve 41 is passed in the latter half of the expansion stroke. The lower right part of FIG. 5 illustrates a state where reverse rotation is made before "EVO".

When reverse rotation is made after "EVO" as represented in the upper right part of FIG. 5, the opened exhaust valve 41 is again closed by the reverse rotation of the crankshaft 13. While the exhaust valve 41 is temporarily opened, the amount of air in the cylinder 2 is increased by inflow of air from the exhaust port 40 (that is, by exchanging gas with the exhaust port 40).

The increase in the amount of air in the cylinder 2 is because while the inside of the cylinder 2 generally has a negative pressure at the end of the expansion stroke, an atmospheric state is set in the cylinder 2 and the exhaust port 40 by a stoppage of fuel supply immediately before reverse rotation of the crankshaft 13 as described above. Thus, when the exhaust valve 41 is opened at the time of reverse rotation of the crankshaft 13 as described above, air flows into the third cylinder 2 in the expansion stroke from the exhaust port 40.

The position where the crankshaft 13 instantaneously stops immediately before reverse rotation thereof may change due to variations in the kinetic energy or the like of the rotation. The piston 12 in the cylinder 2 in the expansion stroke may not pass "EVO" even when the piston 12 is nearest to the bottom dead center (BDC), as illustrated by a solid graph in the lower part of FIG. 4. At this point, the exhaust valve 41 is not opened.

That is, the exhaust valve 41 may be opened or closed when the crankshaft 13 reversely rotates. When the exhaust valve 41 is opened, the amount of air in the cylinder 2 is increased by inflow of air from the exhaust port 40. Accordingly, the air-fuel ratio is shifted to a lean side when fuel is injected into the cylinder 2 for an engine restart. Thus, ignitability may be decreased, or emission may deteriorate due to a decrease in action of the catalyst 43.

Therefore, in the present embodiment, when the exhaust valve 41 is opened at the time of reverse rotation of the crankshaft 13, the amount of fuel injection by the injector 19 of the cylinder 2 in the expansion stroke is increased by considering an increase in the amount of air due to exchange of gas with the exhaust port 40. Hereinafter, a start-up (starterless start-up) procedure for the engine 1 will be specifically described with reference to a flowchart in FIG. 6.

Figure 6:
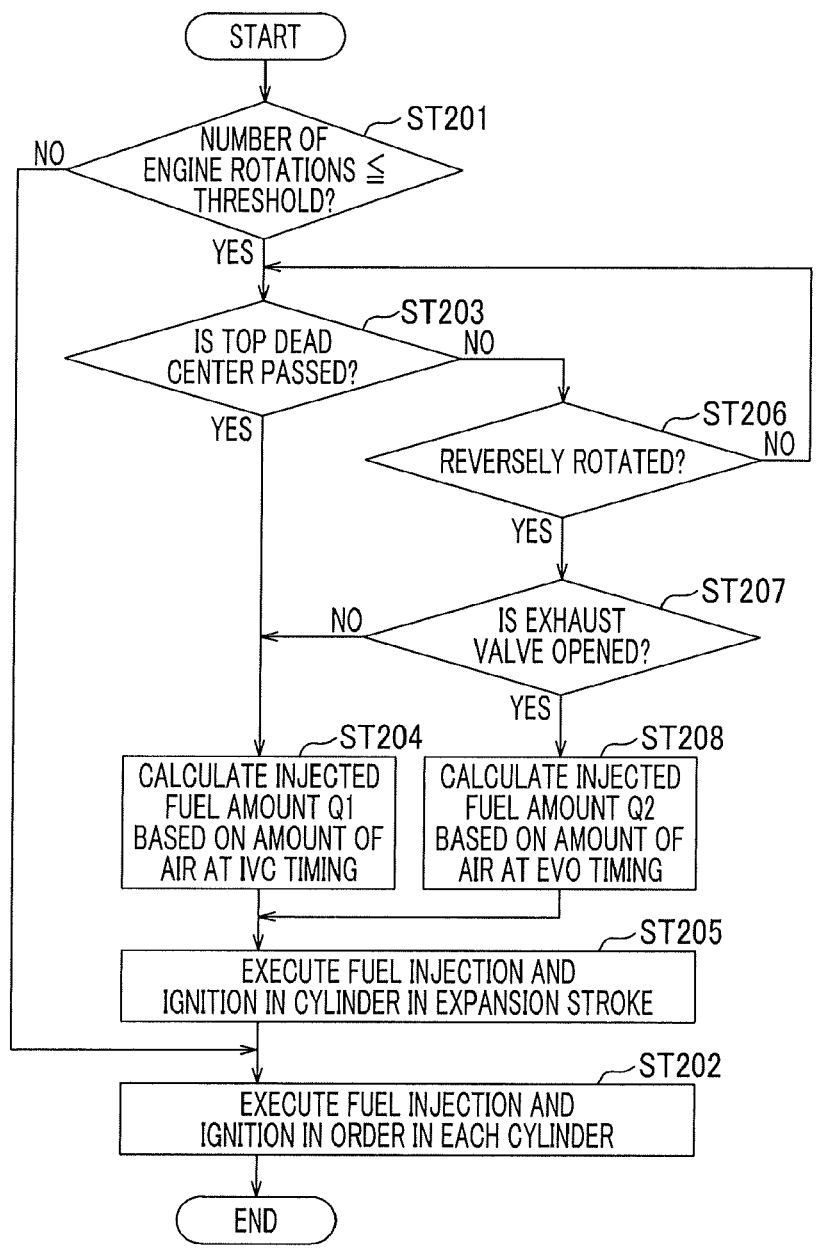
FIG. 6 is a flowchart illustrating a starterless start-up control routine according to the embodiment.

A routine illustrated in FIG. 6 is initiated when the restart condition is established in step ST108 in FIG. 3. In step ST201 after start-up, first, a determination as to whether or not the number of engine rotations is lower than or equal to a predetermined threshold and has the possibility that the next top dead center is not passed is performed. The threshold is set in advance by experiment or the like as the number of engine rotations that allows sufficient passing of the next top dead center, by considering inertia of a rotating part such as the crankshaft 13 or the flywheel and compression reaction force, friction, and the like of the cylinder 2.

In the case of a negative determination (NO), a transition is made to step ST202 in which fuel injection and ignition are started again in order from the cylinder 2 that subsequently meets the top dead center, and the routine is terminated (END). When the number of engine rotations is lower than or equal to the threshold and has the possibility that the next top dead center is not passed (YES), a transition is made to step ST203 in which a determination as to whether or not the cylinder 2 in the compression stroke actually passes the top dead center is performed. In the case of a negative determination (NO), a transition is made to step ST206 described below. In the case of a positive determination (YES), a transition is made to steps ST204, ST205 in which fuel injection and ignition are executed for the starterless start-up.

Specifically, first, in step ST204, the amount of air of the cylinder 2 in the expansion stroke is calculated based on the closing timing of the intake valve 31 (IVC). That is, as represented in FIG. 5, the intake valve 31 is opened at the end of the exhaust stroke, passes through the intake stroke, and is closed in the former half of the compression stroke (in the example of FIG. 5, approximately 80° CA ABDC; "ABDC" means after BDC). When the intake valve 31 is opened in the compression stroke by rotation of the crankshaft 13, the amount of air in the cylinder 2 is temporarily fixed.

At this point, the amount of air of the cylinder 2 can be calculated based on "IVC". That is, the rotational speed of the crankshaft 13 is significantly low immediately before a stoppage of the rotation of the crankshaft 13, and the efficiency of filling the cylinder 2 with air intake is significantly high. At this point, the amount of air filled in the cylinder 2 in the intake stroke can be calculated based on a signal from the air flow meter 103 and the capacity of the cylinder 2 at "IVC".

The amount of fuel injected by the injector 19 (injected fuel amount Q1) is calculated such that a target air-fuel ratio (preferably set to be lower (richer) than the stoichiometric air-fuel ratio) is acquired in accordance with the amount of air in the cylinder 2 that passes the top dead center and transitions to the expansion stroke as represented in the central part of FIG. 5. The air-fuel ratio is set to be low (rich) by considering likeliness of insufficient evaporation of fuel and the oxygen storage capacity of the catalyst 43.

Next, in step ST205, the injector 19 of the cylinder 2 in the expansion stroke injects fuel at a predetermined timing. Then, an ignition delay time set in advance elapses, and the spark plug 20 of the cylinder 2 is electrically conducted, thereby igniting the air-fuel mixture. When combustion torque of the air-fuel mixture is imparted to the crankshaft 13, a transition is made to step ST202 in which fuel injection and ignition are started again in order from the cylinder 2 that subsequently meets the top dead center, and the routine is terminated (END).

In step ST206 after a transition from a negative determination (NO) in step ST203, a determination as to whether or not the crankshaft 13 reversely rotates is performed based on a signal from the crank angle sensor 101 as described above with reference to FIG. 2. In the case of a negative determination (NO) without reverse rotation of the crankshaft 13, a return is made to step ST203. In the case of a positive determination (YES) with reverse rotation of the crankshaft 13, a transition is made to step ST207 in which a determination as to whether or not the exhaust valve 41 is opened at the time of the reverse rotation is performed.

The determination can be performed based on the signal from the crank angle sensor 101. That is, since the exhaust valve 41 is opened at the timing of "EVO" in the latter half of the expansion stroke as described above with reference to FIG. 5, a negative determination (NO) that the exhaust valve 41 is not opened is made when the crankshaft 13 reversely rotates before the cylinder 2 in the expansion stroke passes "EVO" as represented in the lower right part of FIG. 5. Then, a transition is made to step ST204 and step ST205.

When the crankshaft 13 reversely rotates after the cylinder 2 in the expansion stroke passes "EVO" as represented in the upper right part of FIG. 5, a positive determination (YES) that the exhaust valve 41 is opened is made, and a transition is made to step ST208. In this case, air flows from the exhaust port 40 while the exhaust valve 41 is opened. Thus, the amount of air in the cylinder 2 is fixed when the exhaust valve 41 is closed by reverse rotation of the crankshaft 13.

Therefore, in step ST208, the amount of air in the cylinder 2 is calculated based on the opening timing "EVO" of the exhaust valve 41. That is, since an atmospheric state is set in the cylinder 2 and the exhaust port 40 immediately before reverse rotation of the crankshaft 13 as described above, the inside of the cylinder 2 is regarded as being in an atmospheric state by inflow of air from the exhaust port 40, and the amount of air is calculated based on the capacity of the cylinder 2 at "EVO".

An injected fuel amount Q2 of the injector 19 is calculated such that the target air-fuel ratio (lower (richer) than the stoichiometric air-fuel ratio) is acquired in accordance with the calculated amount of air, and a transition is made to step ST205 in which the injector 19 of the cylinder 2 in the expansion stroke injects fuel. Then, the ignition delay time elapses, and the spark plug 20 of the cylinder 2 is electrically conducted, thereby igniting the air-fuel mixture. Then, a transition is made to step ST202 in which fuel injection and ignition are performed in order from the cylinder 2 that subsequently meets the top dead center, and the routine is terminated (END).

The ECU 100, by executing steps ST204, ST208 of the flow in FIG. 6, constitutes injection control means for causing the injector 19 to inject fuel into the cylinder 2 in the expansion stroke when the crankshaft 13 reversely rotates. The ECU 100, by executing step ST207, constitutes determination means for determining whether or not the exhaust valve 41 is opened at the time of reverse rotation of the crankshaft 13.

The ECU 100 (the injection control means), by executing ST208 after a positive determination (YES) in step ST207, is configured to determine the amount of fuel injection by considering a change in the amount of air in the cylinder 2 due to exchange of gas with the exhaust port 40, when the determination means determines that the exhaust valve 41 is opened.

In the present embodiment described heretofore, when the cylinder 2 in the compression stroke passes the top dead center and transitions to the expansion stroke at the time of establishment of the restart condition in the course of automatically stopping the engine 1 by the stop-start control, combustion torque is imparted to the crankshaft 13 by fuel injection and ignition into the cylinder 2, and the starterless start-up of the engine 1 can be smoothly performed.

That is, when fuel is injected into the cylinder 2 in the compression stroke, combustion torque may be generated in the direction of reverse rotation by combustion of the air-fuel mixture when the crankshaft 13 reversely rotates without passing the top dead center of the cylinder 2. However, when fuel injection is performed after transition of the cylinder 2 to the expansion stroke as described above, combustion torque in the direction of forward rotation is securely acquired.

When the crankshaft 13 reversely rotates without the cylinder 2 in the compression stroke passing the top dead center, or when the restart condition is established at the time of reverse rotation of the crankshaft 13, fuel injection and ignition are performed in the cylinder 2 in the expansion stroke where the piston 12 moves to the top dead center by the reverse rotation, and combustion torque in the direction of forward rotation is imparted to the crankshaft 13.

At this point, when the exhaust valve 41 is opened at the time of reverse rotation of the crankshaft 13, the amount of air in the cylinder 2 is increased by inflow of air from the exhaust port 40. Thus, the amount of fuel injected by the injector 19 is increased when the exhaust valve 41 is opened. Accordingly, a shift in the air-fuel ratio of the air-fuel mixture from the target value (slightly lower (richer) than the stoichiometric air-fuel ratio) to the lean side is reduced, and a decrease in the startability of the engine 1 and emission deterioration can be reduced.

The embodiment described heretofore is merely for illustrative purposes and does not limit the configuration, application, and the like of the disclosure. For example, in the embodiment, when the exhaust valve 41 is determined to be opened at the time of reverse rotation of the crankshaft 13 immediately before a stoppage of the engine 1, the amount of air is calculated based on the opening timing "EVO", and the amount of fuel injection is controlled in correspondence with the calculated amount of air. However, the disclosure is not limited thereto.

Figure 7:
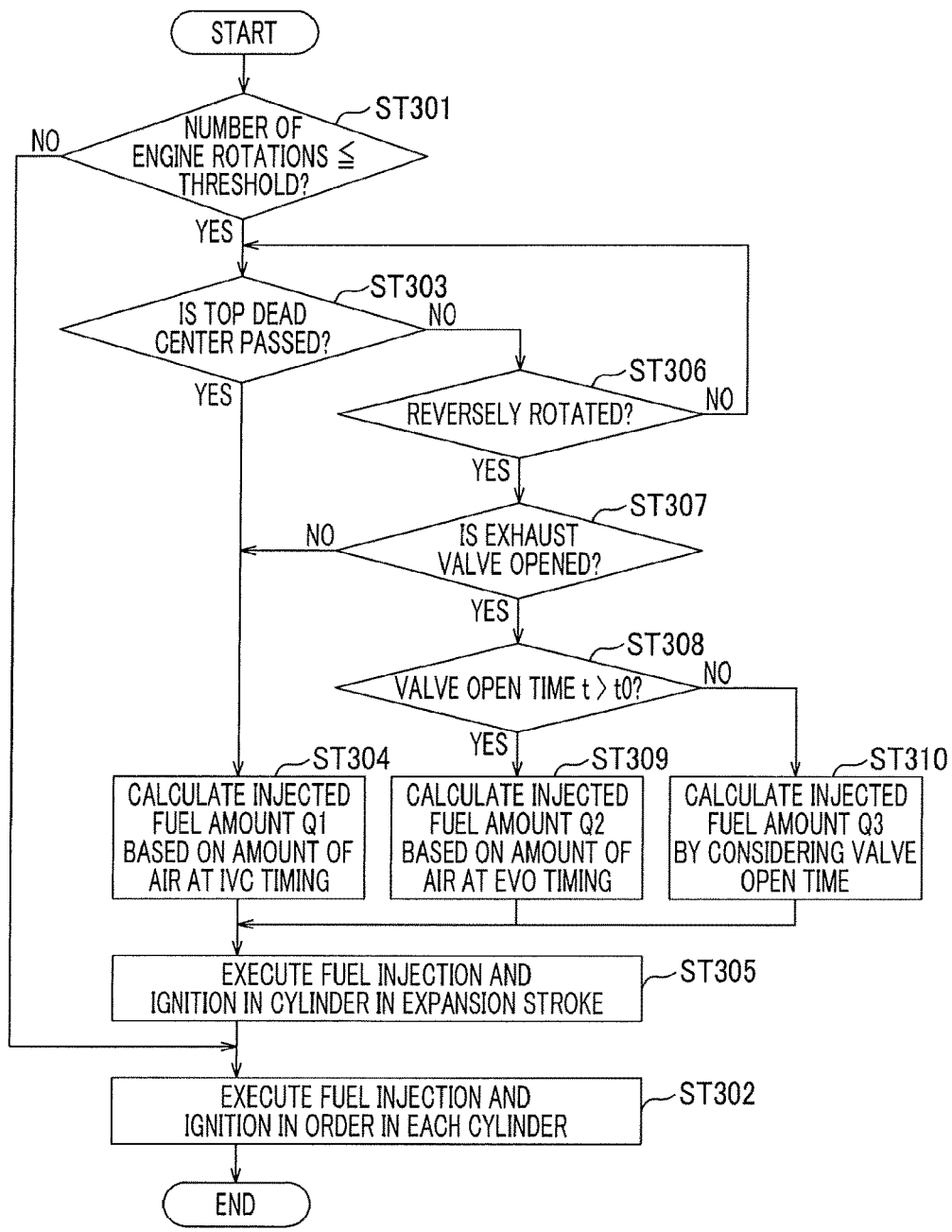
FIG. 7 is a diagram according to another embodiment that corrects the amount of air in accordance with an open period of the exhaust valve, the diagram corresponding to FIG. 6.

That is, when the open period of the exhaust valve 41 is significantly short, or when the opening degree (lift amount) thereof is significantly small, the cylinder 2 may be considered to be not sufficiently filled with air from the exhaust port 40. Thus, the amount of air may be strictly calculated by considering the valve open period, the opening degree, and the like of the exhaust valve 41. Specifically, as illustrated in one example in FIG. 7, first, in each of steps ST301 to ST307, the same processes as steps ST201 to ST207 of the flow illustrated in FIG. 6 are performed.

When a positive determination (YES) that the exhaust valve 41 is opened is made in step ST307, a determination as to whether or not a valve open period t is longer than a predetermined time t0 is performed in step ST308. In the case of a positive determination (YES) with t>t0, a transition is made to step ST309 in which the injected fuel amount Q2 is calculated based on the amount of air at "EVO" in the same manner as step ST208 of the flow in FIG. 6. In the case of a negative determination (NO) with the valve open period t being shorter than or equal to the predetermined time t0, a transition is made to step ST310 in which an injected fuel amount Q3 is calculated by considering the shortness of the valve open period of the exhaust valve 41.

For example, the injected fuel amount Q3 can be calculated by General Formula 1 using a time constant t (may be set in advance by experiment or the like) with a first-order delay as the flow of air flowing into the cylinder 2 from the exhaust port 40 while the exhaust valve 41 is opened. After the injected fuel amounts Q2, Q3 are calculated, a transition may be made to step ST305 in which fuel injection and ignition are performed in the cylinder 2 in the expansion stroke.

$$Q3=Q1+(Q2-Q1)\times\{1-\exp(-t/\tau)\} \qquad \text{General Formula 1}$$

The valve open period t can be calculated based on the signal from the crank angle sensor 101. In addition to or instead of calculating the amount of air by considering the valve open period t, the amount of air may be calculated by considering the opening degree of the exhaust valve 41.

In the embodiment, when the exhaust valve 41 is opened at the time of reverse rotation of the crankshaft 13, the amount of air in the cylinder 2 is calculated by assuming inflow of air from the exhaust port 40. However, the disclosure is not limited thereto. For example, in an engine that includes a turbocharger, the exhaust port 40 is not in an atmospheric state and may have a higher pressure than atmospheric pressure or a lower pressure than atmospheric pressure. In this case, the amount of air may be corrected based on a signal from an exhaust pressure sensor.

In the embodiment, the stop-start condition is set to include the speed of the vehicle being lower than or equal to the predetermined threshold (when the vehicle is considered to be at immediately before a stoppage and when the vehicle is considered to be substantially stopped) and the like. However, the disclosure is not limited thereto. The disclosure can be applied when the engine 1 is automatically stopped and restarted during traveling of the vehicle (a so-called free running control or the like).

While the embodiment describes the starterless start-up, the disclosure is not limited thereto. For example, the disclosure can be applied to starter start-up in which the engine 1 is cranked by the starter motor 18.

While the embodiment describes the case of applying the disclosure to the direct injection four-cylinder gasoline engine 1 mounted in the vehicle and has the injector 19 for direct injection, the disclosure is not limited thereto. The disclosure may be applied to an engine having, for example, three cylinders, five cylinders, six cylinders, or eight cylinders, or may include an injector for port injection in addition to the injector 19 for direct injection. Furthermore, the disclosure is not limited to the gasoline engine and may be applied to, for example, a direct injection alcohol engine or a direct injection gas engine.

The disclosure can smoothly restart an engine without using a starter motor when a restart condition is established immediately before a stoppage of the engine, and is highly effective when being applied to, for example, an engine mounted in an automobile.

The disclosure relates to a start-up control device for an engine. The start-up control device includes an electronic control unit configured to start up a direct injection engine by executing fuel injection and ignition into a cylinder in an expansion stroke, when a restart condition is established immediately before a stoppage of the engine. When a crankshaft reversely rotates before a stoppage of rotation of the crankshaft, the electronic control unit is configured to cause a fuel injection valve to inject fuel into the cylinder in the expansion stroke.

The electronic control unit is further configured to determine whether or not an exhaust valve is opened at the time of reverse rotation of the crankshaft. The electronic control unit is configured to control the amount of fuel injection to acquire a target air-fuel ratio in accordance with the amount of air in the cylinder in the expansion stroke. The electronic control unit is configured to determine the amount of fuel injection in accordance with a change in the amount of air in the cylinder due to exchange of gas with an exhaust path, when the electronic control unit determines that the exhaust valve is opened.

The electronic control unit may use a signal from a crank angle sensor or the like to determine whether or not the exhaust valve is opened at the time of reverse rotation of the crankshaft. That is, the electronic control unit may detect a position where the crankshaft instantaneously stops before reverse rotation of the crankshaft, and determine that the exhaust valve is opened, when the position passes a position of the crankshaft that corresponds to an opening timing of the exhaust valve in the cylinder in the expansion stroke.

When the exhaust valve is opened at the time of reverse rotation of the crankshaft, the electronic control unit controls the amount of fuel injection in accordance with the change in the amount of air in the cylinder due to exchange of gas with the exhaust path. That is, the electronic control unit increases the amount of fuel injection when the amount of air is increased, and decreases the amount of fuel injection when the amount of air is decreased. Accordingly, a difference between the air-fuel ratio and a target value (target air-fuel ratio) is decreased, and a decrease in startability of the engine or emission deterioration is reduced.

The engine may be restarted by starterless start-up that does not use a starter motor as in an example in the related art (JP 2016-136015 A). In this case, achievement of the action has more significance.

More specifically, for example, when the electronic control unit determines that the exhaust valve is not opened, the electronic control unit may calculate the amount of air in the cylinder based on a closing timing of an intake valve in a compression stroke, the intake valve being included in the cylinder in the expansion stroke. Since the efficiency of filling the cylinder is considered sufficiently high immediately before a stoppage of rotation of the crankshaft, the electronic control unit may calculate the amount of air from the capacity of the cylinder at the closing timing of the intake valve.

When the electronic control unit determines that the exhaust valve is opened, the cylinder is considered to be filled with air intake flowing from the exhaust path before the exhaust valve is closed. Thus, the electronic control unit may calculate the amount of air in the cylinder based on an opening timing of the exhaust valve of the cylinder in the expansion stroke, that is, for example, the capacity of the cylinder at the opening timing of the exhaust valve.

When the strict open period of the exhaust valve is significantly short, or when the opening degree (lift amount) thereof is significantly small, the cylinder is considered to be not sufficiently filled with air intake. Thus, considering this point, the electronic control unit may calculate the amount of air in the cylinder in the expansion stroke in accordance with at least one of the valve open period and the opening degree of the exhaust valve of the cylinder in the expansion stroke.

The valve open period and the opening degree of the exhaust valve may be calculated in accordance with specifications of the engine based on the signal from the crank angle sensor before and after reverse rotation of the crankshaft. While the exhaust path and the cylinder are regarded as being in an atmospheric state, the exhaust path may have a higher pressure than atmospheric pressure or a lower pressure than atmospheric pressure when the engine is a turbocharged engine. Thus, the valve open period and the opening degree of the exhaust valve may be corrected based on a signal from an exhaust pressure sensor.

When the crankshaft reversely rotates without a cylinder in a compression stroke passing a top dead center at the time of establishment of a restart condition for the engine, the electronic control unit may be configured to control fuel injection in the cylinder that is in the expansion stroke at the time of reverse rotation of the crankshaft. When the cylinder in the compression stroke passes the top dead center and transitions to the expansion stroke, the electronic control unit may be configured to control fuel injection in the cylinder.

That is, in the case of injecting fuel into the cylinder in the compression stroke and igniting the fuel after a predetermined amount of time elapses, significant torque is generated in the direction of reverse rotation by combustion of the air-fuel mixture when the crankshaft reversely rotates without passing the top dead center of the cylinder. Meanwhile, when fuel is injected after the cylinder transitions to the expansion stroke, combustion torque in the direction of forward rotation is accurately acquired, and the engine can be started up.

When the restart condition is established after reverse rotation of the crankshaft, the electronic control unit may be configured to control fuel injection in the cylinder that is in the expansion stroke at the time of establishment of the restart condition. By doing so, starterless start-up can be performed even immediately before a stoppage of rotation of the crankshaft immediately before a stoppage of the engine.

The electronic control unit may be configured to determine whether or not the valve open period of the exhaust valve is longer than a predetermined amount of time. The electronic control unit may be configured to calculate the amount of air in the cylinder based on an opening timing of the exhaust valve of the cylinder in the expansion stroke when the electronic control unit determines that the exhaust valve is opened and that the valve open period of the exhaust valve is longer than the predetermined amount of time. The electronic control unit may be configured to determine the amount of fuel injection by considering the valve open period, when the electronic control unit determines that the exhaust valve is opened and that the valve open period of the exhaust valve is shorter than or equal to the predetermined amount of time.

As described heretofore, the start-up control device for an engine according to the disclosure controls the amount of fuel injection by considering a change in the amount of air based on exchange of gas with the exhaust path when the exhaust valve is opened in the cylinder in the expansion stroke at the time of reverse rotation of the crankshaft immediately before a stoppage of the engine. Thus, a difference between the air-fuel ratio and the target value can be decreased, and a decrease in startability of the engine or emission deterioration can be reduced.

What is claimed is:

1. A start-up control device for an engine, the device comprising:
circuitry configured to:
start up a direct injection engine by executing fuel injection and ignition into a cylinder in an expansion stroke when a restart condition is established immediately before the engine stops; and
when a crankshaft reversely rotates before a rotation of the crankshaft stops:
determine whether or not an exhaust valve of the cylinder in the expansion stroke is opened at a time of the reverse rotation of the crankshaft,
determine an amount of fuel injection in accordance with a change in an amount of air in the cylinder in the expansion stroke due to exchange of gas with an exhaust path via the exhaust valve of the cylinder in the expansion stroke such that an air-fuel ratio of a mixture of fuel and the air reaches a target air-fuel ratio when it has been determined that the exhaust valve of the cylinder in the expansion stroke is opened at the time of the reverse rotation of the crankshaft,
cause a fuel injection valve to inject the fuel in accordance with the determined amount of fuel injection into the cylinder in the expansion stroke, and
ignite the fuel in the cylinder,
wherein reversely rotates includes rotation in a direction opposite to that in which the crankshaft rotates as a result of the start up, and
wherein the circuitry is configured to calculate the amount of air in the cylinder in the expansion stroke based on an opening timing of the exhaust valve of the cylinder in the expansion stroke when it has been determined that the exhaust valve of the cylinder in the expansion stroke is opened at the time of the reverse rotation of the crankshaft.

2. The start-up control device according to claim 1, wherein the circuitry is configured to start up the engine without using a starter motor.

3. The start-up control device according to claim 1, wherein the circuitry is configured to calculate the amount of air in the cylinder in the expansion stroke based on a closing timing of an intake valve in a compression stroke, the intake valve being included in the cylinder in the expansion stroke, when it has been determined that the exhaust valve of the cylinder in the expansion stroke is not opened at the time of the reverse rotation of the crankshaft.

4. The start-up control device according to claim 1, wherein the circuitry is configured to calculate the amount of air in the cylinder in the expansion stroke based on at least one of a valve open period of the exhaust valve of the cylinder in the expansion stroke and an opening degree of the exhaust valve of the cylinder in the expansion stroke when it has been determined that the exhaust valve of the cylinder in the expansion stroke is opened at the time of the reverse rotation of the crankshaft.

5. The start-up control device according to claim 4, wherein circuitry is configured to:
determine whether or not the valve open period of the exhaust valve of the cylinder in the expansion stroke is longer than a predetermined amount of time;
calculate the amount of air in the cylinder in the expansion stroke based on an opening timing of the exhaust valve of the cylinder in the expansion stroke when it has been determined that the exhaust valve of the cylinder in the expansion stroke is opened at the time of the reverse rotation of the crankshaft and that the valve open period of the exhaust valve of the cylinder in the expansion stroke is longer than the predetermined amount of time; and
calculate the amount of air in the cylinder in the expansion stroke based on at least one of the valve open period and the opening degree of the exhaust valve of the cylinder in the expansion stroke when it has been determined that the exhaust valve of the cylinder in the expansion stroke is opened at the time of the reverse rotation of the crankshaft and that the valve open period of the exhaust valve of the exhaust valve of the cylinder in the expansion stroke is shorter than or equal to the predetermined amount of time.

6. The start-up control device according to claim 1, wherein the circuitry is configured to:
control fuel injection in the cylinder that is in the expansion stroke at the time of reverse rotation of the crankshaft when the crankshaft reversely rotates without a cylinder in a compression stroke passing a top dead center at a time when the restart condition is established, and
control fuel injection in the cylinder in the compression stroke passing the top dead center at the time when the restart condition is established when the cylinder in the compression stroke passes the top dead center and transitions to the expansion stroke.

7. The start-up control device according to claim 1, wherein the circuitry is configured to control fuel injection in the cylinder that is in the expansion stroke at a time when the restart condition is established when the restart condition is established after the reverse rotation of the crankshaft.

8. The start-up control device according to claim 1, wherein the circuitry is configured to
detect a stop position where the crankshaft temporarily stops rotating before the reverse rotation, and
determine that the exhaust valve is opened when the stop position is advanced with respect to a position of the crankshaft that corresponds to an opening timing of the exhaust valve in the cylinder in the expansion stroke.

9. A start-up control device for an engine, the device comprising:
circuitry configured to:
start up a direct injection engine by executing fuel injection and ignition into a cylinder in an expansion stroke when a restart condition is established immediately before the engine stops; and
when a crankshaft reversely rotates before a rotation of the crankshaft stops:
determine whether or not an exhaust valve of the cylinder in the expansion stroke is opened at a time of the reverse rotation of the crankshaft,
determine an amount of fuel injection in accordance with a change in an amount of air in the cylinder in the expansion stroke due to exchange of gas with an exhaust path via the exhaust valve of the cylinder in the expansion stroke such that an air-fuel ratio of a mixture of fuel and the air reaches a target air-fuel ratio when it has been determined that the exhaust valve of the cylinder in the expansion stroke is opened at the time of the reverse rotation of the crankshaft,
cause a fuel injection valve to inject the fuel in accordance with the determined amount of fuel injection into the cylinder in the expansion stroke, and
ignite the fuel in the cylinder, wherein reversely rotates includes rotation in a direction opposite to that in which the crankshaft rotates as a result of the start up, and wherein the circuitry is configured to calculate the amount of air in the cylinder in the expansion stroke based on at least one of a valve open period of the exhaust valve of the cylinder in the expansion stroke and an opening degree of the exhaust valve of the cylinder in the expansion stroke when it has been determined that the exhaust valve of the cylinder in the expansion stroke is opened at the time of the reverse rotation of the crankshaft.

10. The start-up control device according to claim 9, wherein the circuitry is configured to start up the engine without using a starter motor.

11. The start-up control device according to claim 9, wherein the circuitry is configured to calculate the amount of air in the cylinder in the expansion stroke based on a closing timing of an intake valve in a compression stroke, the intake valve being included in the cylinder in the expansion stroke, when it has been determined that the exhaust valve of the cylinder in the expansion stroke is not opened at the time of the reverse rotation of the crankshaft.

12. The start-up control device according to claim 9, wherein the circuitry is configured to calculate the amount of air in the cylinder in the expansion stroke based on an opening timing of the exhaust valve of the cylinder in the expansion stroke when it has been determined that the exhaust valve of the cylinder in the expansion stroke is opened at the time of the reverse rotation of the crankshaft.

13. The start-up control device according to claim 9, wherein circuitry is configured to:

determine whether or not the valve open period of the exhaust valve of the cylinder in the expansion stroke is longer than a predetermined amount of time;

calculate the amount of air in the cylinder in the expansion stroke based on an opening timing of the exhaust valve of the cylinder in the expansion stroke when it has been determined that the exhaust valve of the cylinder in the expansion stroke is opened at the time of the reverse rotation of the crankshaft and that the valve open period of the exhaust valve of the cylinder in the expansion stroke is longer than the predetermined amount of time; and calculate the amount of air in the cylinder in the expansion stroke based on at least one of the valve open period and the opening degree of the exhaust valve of the cylinder in the expansion stroke when it has been determined that the exhaust valve of the cylinder in the expansion stroke is opened at the time of the reverse rotation of the crankshaft and that the valve open period of the exhaust valve of the exhaust valve of the cylinder in the expansion stroke is shorter than or equal to the predetermined amount of time.

14. The start-up control device according to claim 9, wherein the circuitry is configured to:

control fuel injection in the cylinder that is in the expansion stroke at the time of reverse rotation of the crankshaft when the crankshaft reversely rotates without a cylinder in a compression stroke passing a top dead center at a time when the restart condition is established, and control fuel injection in the cylinder in the compression stroke passing the top dead center at the time when the restart condition is established when the cylinder in the compression stroke passes the top dead center and transitions to the expansion stroke.

15. The start-up control device according to claim 9, wherein the circuitry is configured to control fuel injection in the cylinder that is in the expansion stroke at a time when the restart condition is established when the restart condition is established after the reverse rotation of the crankshaft.

16. The start-up control device according to claim 9, wherein the circuitry is configured to detect a stop position where the crankshaft temporarily stops rotating before the reverse rotation, and determine that the exhaust valve is opened when the stop position is advanced with respect to a position of the crankshaft that corresponds to an opening timing of the exhaust valve in the cylinder in the expansion stroke.

\* \* \* \* \*